United States Patent [19]

Araki et al.

[11] Patent Number: 4,720,720
[45] Date of Patent: Jan. 19, 1988

[54] MOTOR-DRIVEN FILM WINDER FOR CAMERAS

[75] Inventors: Kunihiko Araki; Tomoya Kitajima; Yoshio Serikawa, all of Tokyo; Mikio Kobayashi, Kanagawa; Hiroshi Terui, Tokyo; Kenji Koyama, Kanagawa, all of Japan

[73] Assignees: Ricoh Company, Ltd., Tokyo; Ricoh Optical Industries Co., Ltd., Iwate, both of Japan

[21] Appl. No.: 777,250

[22] Filed: Sep. 18, 1985

[30] Foreign Application Priority Data

Sep. 18, 1984 [JP] Japan ............................ 59-195559
Sep. 18, 1984 [JP] Japan ............................ 59-195560
Sep. 27, 1984 [JP] Japan ............................ 59-200432

[51] Int. Cl.⁴ ........................................ G03B 1/66
[52] U.S. Cl. ............................. 354/173.11; 354/217
[58] Field of Search .......... 354/412, 173.1, 173.11, 354/215, 217, 218, 238.1, 266, 268

[56] References Cited

U.S. PATENT DOCUMENTS

| | | | |
|---|---|---|---|
| 3,135,182 | 6/1964 | Hintze et al. | 354/217 X |
| 3,404,614 | 10/1968 | Naumann | 354/217 X |
| 3,613,542 | 10/1971 | Wetzlar et al. | 354/217 X |
| 3,640,201 | 2/1972 | Kimura | 354/173.11 |
| 3,842,587 | 10/1974 | Strauss et al. | 354/412 |
| 4,312,581 | 1/1982 | Miyagawa et al. | 354/217 X |

FOREIGN PATENT DOCUMENTS

55974 7/1982 Japan ............................ 354/173.1

Primary Examiner—W. B. Perkey
Attorney, Agent, or Firm—Oblon, Fisher, Spivak, McClelland & Maier

[57] ABSTRACT

A motor-driven film winder for use with a camera includes an exposure inhibit signal generator for generating an exposure inhibit signal when the number of frames to be exposed which is set by an exposure setting unit coincides with the number of exposed frames counted by a counter. The motor-driven film winder also has an unexposed frame indicator for indicating the difference between the number of frames set by the exposure setting unit and the count of the counter as the number of remaining unexposed frames when a shutter release operation of the camera is interrupted before the count of the counter reaches the preset number of frames to be exposed, and an intermittent exposure canceling signal generator for issuing an intermittent exposure cancelling signal to an intermittent exposure signal generator when the preset number of frames to be exposed coincides with the counter of the counter.

8 Claims, 9 Drawing Figures

MOTOR-DRIVEN FILM WINDER FOR CAMERAS

BACKGROUND OF THE INVENTION

The present invention relates to a motor-driven film winder for use with a camera.

For making successive exposures rapidly on a camera, a motor-driven film winder is usually used in combination with the camera for automatically winding or transporting the film. Such a motor-driven film winder is capable of transporting film frames successively at a high rate, such as several frames per second, as long as the shutter release button is pressed. Therefore, it would be difficult for even a skilled photographer to control the number of exposures to be made simply by operating the shutter release button. More or less frames than desired would frequently be exposed in the motor-driven film transport mode. Accordingly, there have been demands for a motor-driven film winder capable of allowing the user to set a desired number of exposures to be made.

The motor-driven film winder with such an exposure number setting capability should preferably be designed to incorporate some means for indicating the number of any remaining frames available for exposure when the motor drive exposure sequence would be interrupted for some reasons such as an unexpected change of the object being photographed.

Motor-driven film winders are also desired to enable the camera to make intermittent exposures at prescribed time intervals so that various continuously changing phenomena such as the growth and condition of animals and plants can be recorded at regular intervals. Another use of the intermittent or interval photographing system is to automatically take pictures of places requiring continuous watching, such as areas around entrances, exits, teller's cages, vaults of banks or other financial institutions. Should a crime such as bank robbery be committed in the bank or financial facility, some pictures taken by the interval photographing system may be used as evidence of the crime or to identify the criminal or criminals involved. Since the interval photographing system is automatically operated and not usually attended by anybody during operation, it uses an elongate strip of film to take pictures successively for a long period of time. However, some areas only need to be photographed intermittently only during the daytime or for a prescribed period of time.

The conventional motor-driven film winders capable of interval or intermittent picture-taking operation have failed to stop the interval photographing process after a predetermined number of frames have been exposed or a preset time has elapsed. Therefore, many pictures have been taken intermittently under bad conditions as during the night or with inappropriate exposure settings or of unnecessary objects, with the result that some film frames has been wasted.

One solution to the above problems would be to use a proper accessory in combination with the camera. However, the camera with such an accessory would be poor in portability and undesirable economically.

SUMMARY OF THE INVENTION

It is an object of the present invention to provide a motor-driven film winder for use with cameras which is capable of allowing the user to set a desired number of frames to be exposed and of automatically stopping the picture-taking process when the frame number setting is reached.

Another object of the present invention is to provide a motor-driven film winder for use with cameras which is capable of allowing the user to set a desired number of frames to be exposed, of automatically stopping the film winding operation and the picture-taking process when the frame number setting is reached, and of letting the user know the number of remaining unexposed frames when the picture-taking process is interrupted.

Still another object of the present invention is to provide an interval photographing system composed of a camera and a motor-driven film winder for allowing the user to set a picture-taking time interval and a number of frames to be exposed, and for automatically cancelling the intermittent or interval photographing process to stop any subsequent picture-taking operation when the number of exposed frames reaches the frame number setting.

According to the present invention, there is provided a motor-driven film winder for use with a camera includes a film winding motor energizable in response to an exposure end signal generated from the camera each time an exposure cycle ends, a counter for counting the exposure end signal, or a drive signal for driving the film winding motor, or a film winding completion signal, an exposure setting means for setting the number of frames to be exposed by the camera, and an exposure inhibit signal generating means for issuing an exposure inhibit signal to the camera when the number of frames set by the exposure setting means coincides with the count of the counter. The motor-driven film winder may also includes an unexposed frame indicating means for indicating the difference between the number of frames set by the exposure setting means and the count of the counter as the number of remaining unexposed frames when a shutter release operation of the camera is interrupted before the count of the counter reaches the number of frames set by the exposure setting means.

According to the present invention, there is also provided a A motor-driven film winder for use with a camera includes a motor for winding a film to allow the camera to automatically take pictures at a prescribed interval, an exposure control means responsive to an exposure signal for determining appropriate exposure conditions to effect exposure operation, an intermittent exposure signal generating means for setting an exposure time interval in response to external operation and for issuing an intermittent exposure signal at the set exposure time interval, the intermittent exposure signal generating means being de-energizable in response to an intermittent exposure canceling signal, a motor control means responsive to the completion of the exposure operation effected by the exposure control means for energizing the motor and also substantially responsive to the completion of film winding operation for de-energizing the motor, a counter for counting an exposure end signal, a motor drive signal, or a film winding completion signal, an exposure setting means for setting the number of frames to be exposed by the camera, exposure inhibit signal generating means for issuing an exposure inhibit signal to the camera when the number of frames set by the exposure setting means coincides with the count of the counter, and an intermittent exposure canceling signal generating means for issuing an intermittent exposure canceling signal to the intermittent exposure signal generating means in response to the exposure inhibit signal.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Like or corresponding parts are denoted by like or corresponding reference characters throughout several views.

Figure 1:
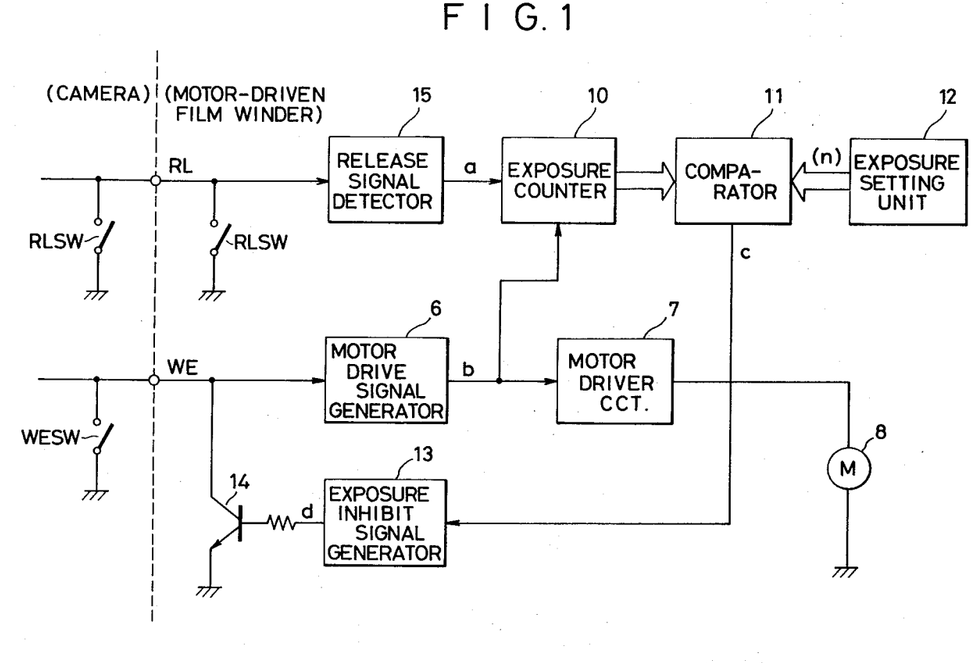
FIG. 1 is a block diagram of a motor-driven film winder according to an embodiment of the present invention.

FIG. 1 shows a motor-driven film winder for use with a camera, according to an embodiment of the present invention. The camera has a switch WESW which will be turned off or open each time a film winding process is completed and will be turned on or closed each time a shutter-activated exposure process is ended. An exposure end signal WE of a low level which is generated when the switch WESW is closed, and a winding completion signal WE of a high level which is generated when the switch WESW is opened are applied to the motor-driven film winder. In the motor-driven film winder, the exposure end signal WE is applied to a motor drive signal generator 6 which issues a motor drive signal b to a motor driver circuit 7. The motor driver circuit 7 energizes a film winding motor 8 each time the exposure end signal WE is applied to the motor-driven film winder. When the winding completion signal WE is applied to the motor-driven film winder, the film winding motor 8 is de-energized or braked by the motor driver circuit 7, and the shutter in the camera can now be released.

A release signal RL from a release switch RLSW is applied from the camera to the motor-driven film winder. The release signal RL as it is supplied to the motor-driven film winder is detected by a release signal detector 15 which produces a detected signal a. The detected signal a is high as long as the release signal RL is low (the release switch RLSW is turned on), and is applied as a reset input to an exposure or film counter 10. The exposure counter 10 can be reset by a negative-going edge of the detected signal. The exposure counter 10 is also supplied with the motor-drive signal b as an input to be counted. Since the motor-drive signal b is produced each time the film winding motor is to be energized right after an exposure cycle is finished and until one film frame is transported, counting the motor-drive signal b with the exposure counter 10 is equal to counting how many times the film has been wound or how many exposures have been made. The count of the exposure counter 10, or the data indicative of the number of film frames exposed, is applied to a comparator 11 which compares the same data with data indicative of an exposure setting n representing the number of frames to be exposed and supplied from an exposure setting unit 12. If both of the data items compared coincide with each other, then the comparator 11 issues a coincidence signal c to enable an exposure inhibit signal generator 13 to produce an exposure inhibit signal d. This exposure inhibit signal d turns on a switching element 14 (comprising a transistor in FIG. 1) connected between ground and the signal line for the winding completion signal or exposure end signal WE for bringing the signal line to the ground potential. This is equivalent to application of the exposure inhibit signal d through the signal line to the camera, thus inhibiting subsequent shutter releasing operation.

In the illustrated arrangement, the sequence operation is brought to an end when a film frame is transported for a next exposure cycle, and hence the exposure inhibit signal d is generated after n exposures have been made by the shutter after the film has been wound (n−) times. Therefore, the motor 8 is stopped when the film is wound (n+1) times after n exposures have been made.

When the n film frames as set by the exposure setting unit 12 have been exposed, any subsequent shutter release is inhibited and the film is not wound even if the release switch RLSW is continuously depressed. Upon turning off the release switch RLSW, the signal a goes low to reset the exposure counter 10. The above operation is illustrated in the period T1 in the timing chart of FIG. 2.

Figure 2:
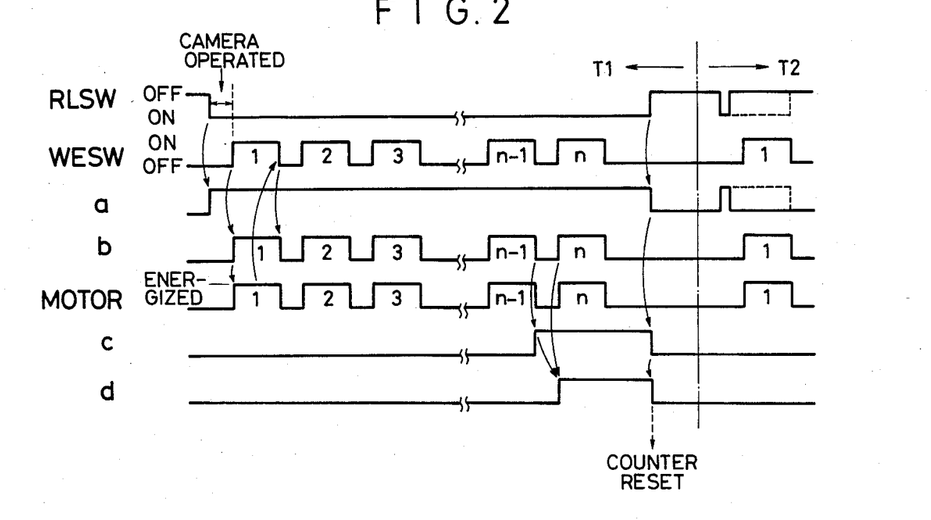
FIG. 2 is a timing chart explanating operation of the motor-driven film winder shown in FIG. 1.

If the release switch RLSW is turned off to interrupt the picture-taking operation before the exposure setting by the exposure setting unit 12 is reached, then the exposure counter 10 is immediately reset as shown in the period T2 in FIG. 2. The exposure counter 10 will start counting exposures when the release switch RLSW is turned on again.

Figure 3:
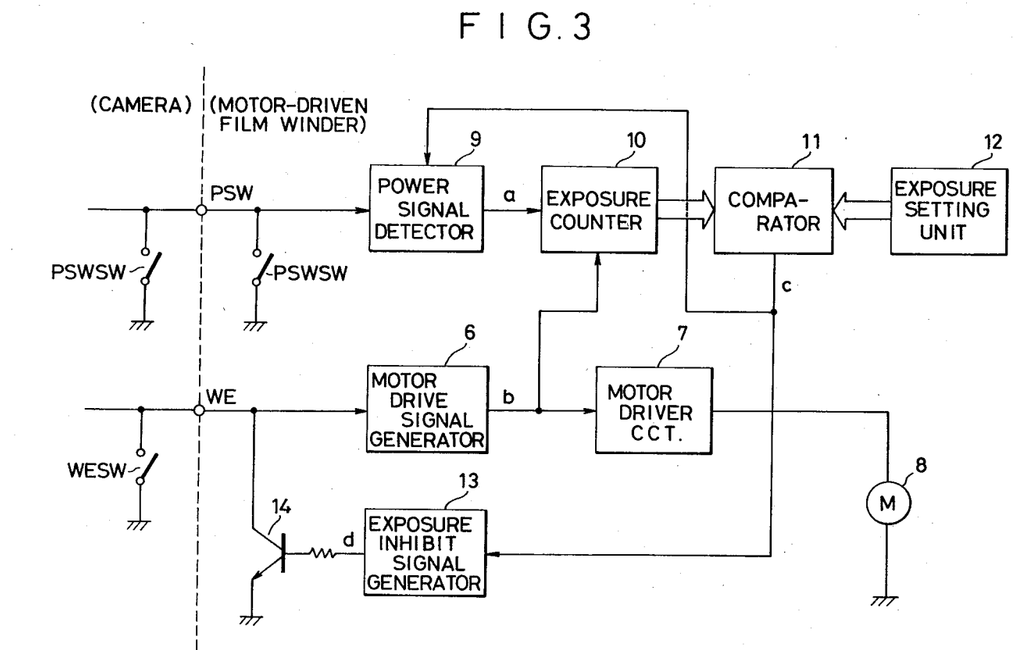
FIG. 3 is a block diagram of a motor-driven film winder according to another embodiment of the present invention.

FIG. 3 shows another embodiment of the present invention. In this embodiment, the camera has an auxiliary release button to be operated upon by the left hand of the user as well as the release button to be operated upon by the user's right hand. The auxiliary release button may comprise a self-timer start button capable of starting the shutter release by setting the duration of delay to "0", but incapable of producing the release signal RL.

In the camera of the type described above, the shutter can be released by the auxiliary release button. With the arrangement of FIG. 1, the shutter release can be inhibited when the number of exposures set by the exposure setting unit 12 has been reached, but the exposure counter 10 could not be reset.

Since the arrangement of FIG. 3 is only partly different from the embodiment of FIG. 1, such a different portion will chiefly be described.

In the embodiment illustrated in FIG. 3, the camera has a power switch PSWSW (which may sometimes be called a photometric switch as it initiates a photometric condition) which can be turned on by half-depressing the release button, and the motor-driven film winder has a similar power switch PSWSW which can be turned on or off by depressing or releasing the auxiliary release button. A power signal PSW is issued from a power signal terminal when the auxiliary release button is turned on or off. The exposure counter 10 is reset by detecting the power signal PSW.

More specifically, when the power signal PSW is applied from the power switch PSWSW in response to depression or release of the release button in the camera or the auxiliary release button, the power signal PSW is detected by a power signal detector 9 which produces a detected signal a to reset the exposure counter 10. The subsequent operation is substantially the same as that of the arrangement of FIG. 1, except that the power signal detector 9 can discriminate the output from the comparator 11.

Figure 4:
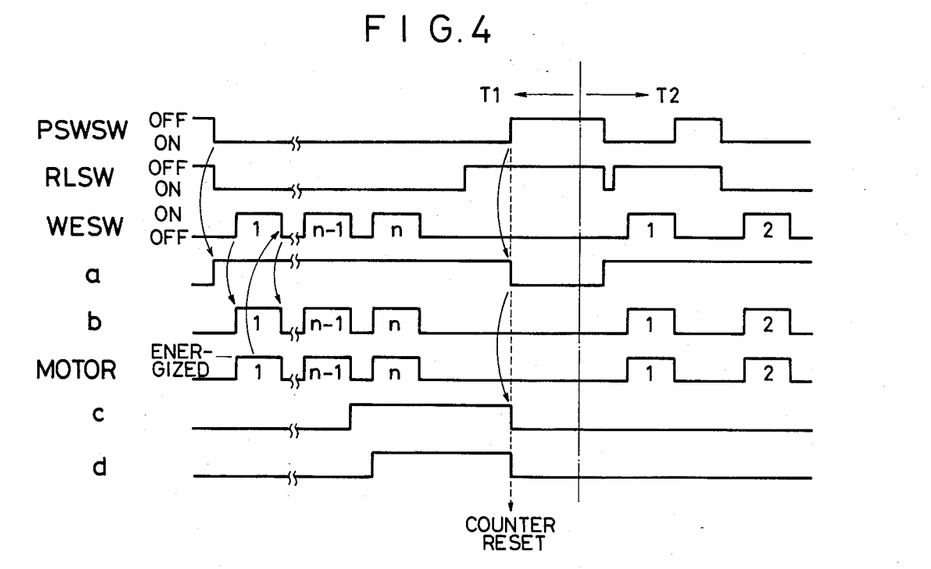
FIG. 4 is a timing chart explanating operation of the motor-driven film winder shown in FIG. 3.

FIG. 4 shows the timing chart of operation of the system shown in FIG. 3. In the time period T1, a number of film frames which are preset by the exposure setting unit 12 are exposed, and in the time period T2, the release switch RLSW is turned off to interrupt the picture-taking operation before the preset number of exposures is reached.

In the period T2, the detected output signal a from the power signal detector 9 remains high since no coincidence signal c is issued from the comparator 11 even when the power signal PSW goes high, and hence the counter 10 is not reset. In the event that the power switch PSWSW is turned on for starting to take pictures again, the comparator 11 issues a coincidence signal c upon exposure of a number of frames which is equal to the difference between the preset number of frames to be exposed and the number of frames exposed, since the counter 10 is not reset. The switching element 14 is therefore turned on by the exposure inhibit signal generator 13 to stop the film winding operation and issue an exposure inhibit signal. As the release button or the auxiliary release button is subsequently returned to the original position, the detected signal a from the power signal generator 9 changes from the high level to the low level, thus resetting the counter 10 to bring the motor-driven film winder to the initial condition.

Where the arrangement is such that only the exposure end signal or the winding completion signal WE is fed from the camera to the motor-driven film winder, the exposure counter 10 may be reset by a manually-operated reset switch disposed in the motor-driven film winder.

While in the foregoing embodiments the motor drive signal b is supplied as the input to be counted bo the exposure counter 10, the exposure counter 10 may be supplied with the winding completion signal or the exposure end signal WE as the input to be count.

With the embodiments described above, the desired number of frames to be exposed can be set, and the picture-taking operation can automatically be inhibited when the preset number of frames have been exposed. Therefore, the film loaded in the camera is prevented from being wasted in the motor drive sequence mode, and any desired scene is prevented from being photographed with a smaller number of frames than a planned number of frames.

Figure 5:
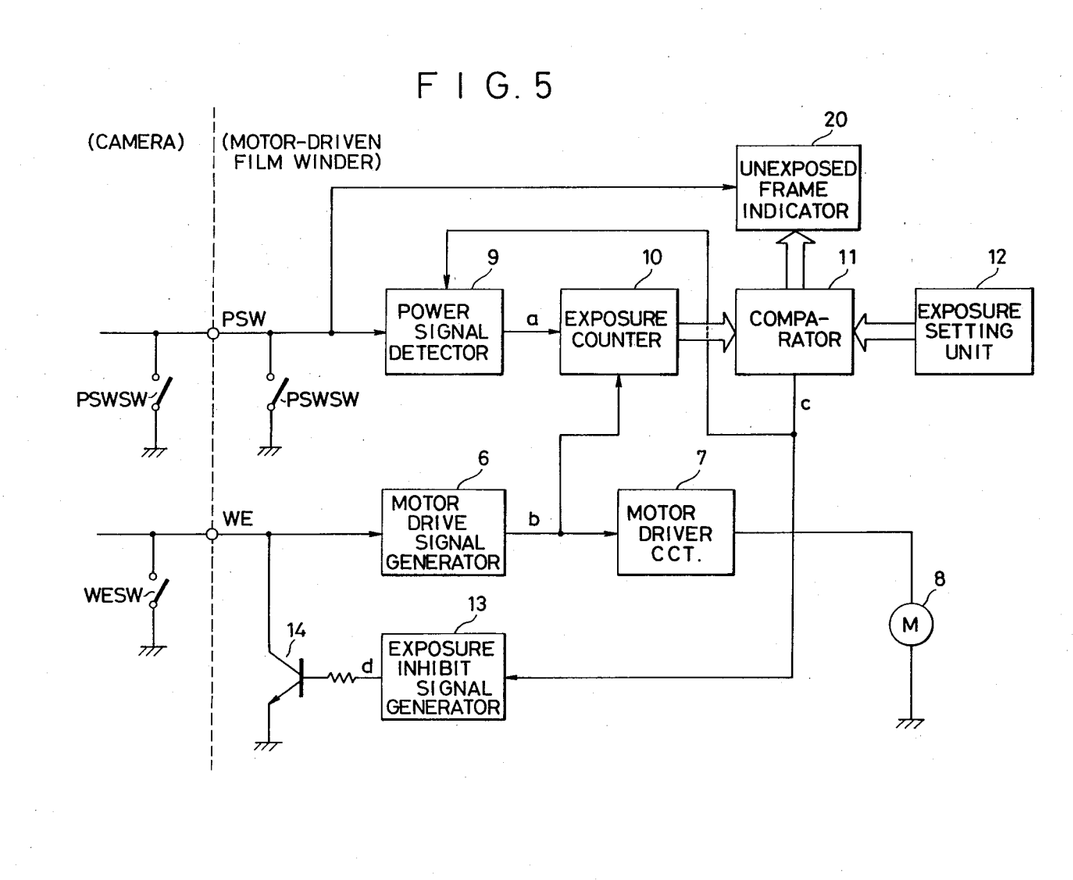
FIG. 5 is a block diagram of a motor-driven film winder according to still another embodiment of the present invention.

FIG. 5 shows a motor-driven film winder according to still another embodiment. The motor-driven film winder of FIG. 5 has an unexposed frame indicator for indicating a remaining number of frames which is equal to the difference between a preset number of frames to be exposed and a count of the exposure counter, when the shutter release operation is interrupted before the preset number of frames set by the exposure setting unit is reached. Since only a portion of the entire arrangement of FIG. 5 is different from the embodiment of FIG. 3, such a different portion will chiefly be described.

The power switch PSWSW shown in FIG. 5 comprises a switch which can be turned on when the release button is half-depressed and the self-timer start button is depressed. When the power switch PSWSW is turned on, the camera is brought into a so-called photometric mode in which light is measured and computed and the result is indicated. In the motor-driven film winder, the power signal PSW is detected as a detected signal a by the power signal detector 9. When the preset number of frames n set by the exposure setting unit 12 are exposed, any subsequent shutter release operation is inhibited and the film winding operation is stopped even if the release button or the self-timer start button remains depressed continuously. The detected signal a from the power signal detector 9 goes high when the power switch PSWSW is turned off and the power signal PSW goes high, insofar as the coincidence signal c is issued from the comparator 11. The exposure counter 10 is now reset, and subsequent operation is illustrated in the period T1 in the timing chart of FIG. 6.

Figure 6:
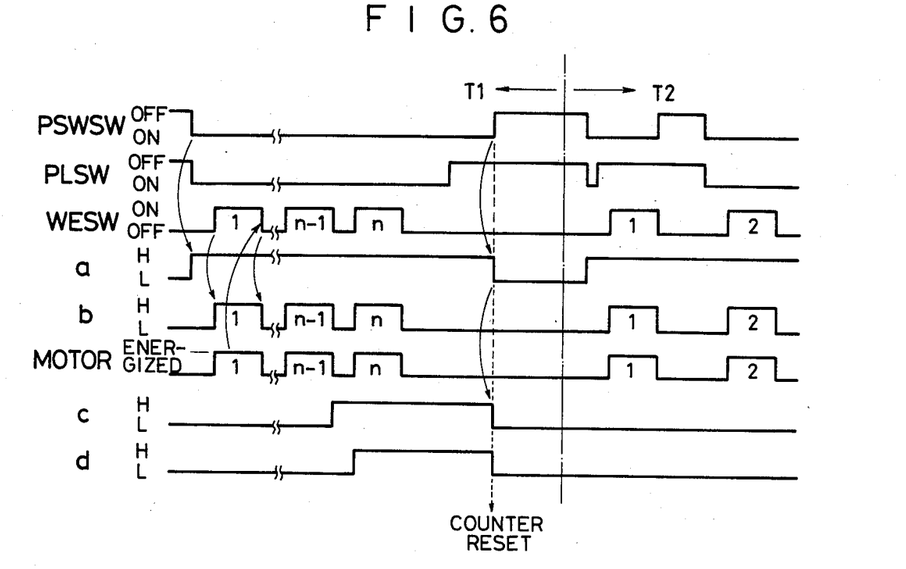
FIG. 6 is a timing chart explanatory of operation of the motor-driven film winder of FIG. 5.

Operation in the period T2 in FIG. 6 is effected when the release button or the self-timer start button are released to return to the initial position, or the power switch PSWSW is turned off to interrupt the picture-taking operation before the preset number of frames to be exposed is not reached. More specifically, in the period T2, the output signal a from the power signal detector 9 remains high even if the power signal PSW goes high since no coincidence signal c is issued from the comparator 11, and hence the exposure counter 10 is not reset. At this time, the difference is determined by the comparator 11 between the count of the exposure counter 10 or the data indicating how many times the film is wound and the preset number of frames to be exposed. The determined difference is indicated as a number of unexposed frames on the unexposed frame indicator, denoted at 20.

The unexposed frame indicator 20 may comprise a light-emitting means such as light-emitting diodes (LEDs) or a sound-producing means comprising a piezoelectric device, for example. The number of remaining unexposed frames can be indicated by energizing the light-emitting means or the sound-producing means as many times as the number of remaining unexposed frames. Consequently, the remaining number of unexposed frames can easily and clearly be recognized by the user. The unexposed frame indicator 20 of such a construction is much simpler in circuit arragement (including light-emitting elements) than the 7-segment numerical display device, for example.

Figure 7:
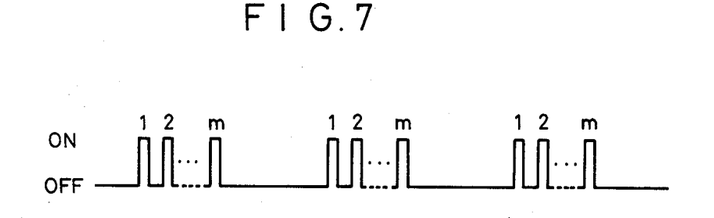
FIG. 7 is a timing chart illustrating operation of an unexposed frame indicator in the motor-driven film winder shown in FIG. 5.

FIG. 7 shows an example of operation of the unexposed frame indicator 20, in which it emits light or sound periodically as many times as the number m of remaining frames left unexposed.

When the power switch PSW is turned on in order to start taking pictures again while there are unexposed frames, the comparator 11 issues a coincidence signal c at the time the unexposed frames are exposed, since the exposure counter 10 is not reset. The switching element 14 is turned on by the exposure inhibit signal generator 13 to generate an exposure inhibit signal for thereby inhibiting subsequent picture-taking operation. Thereafter, when the release button or the self-timer start button (or a similar control button in the motor-driven film winder) is returned to the initial position, the power switch PSWSW is turned off to cause the signal a from the power signal detector 9 to go high. The exposure counter 10 is now reset to its initial condition. The unexposed frame indicator 20 then indicates "0" or makes no indication. Instead of the power signal PSW, the release signal may be fed from the camera to the motor-driven film winder.

Where only the exposure end signal or the winding completion signal WE is applied from the camera to the motor-driven film winder, the exposure counter 10 may be reset by a manually-operated reset switch disposed in the motor-driven film winder.

The exposure counter 10 may be supplied with the winding completion signal or the exposure end signal WE as the input to be count.

According to the embodiment of FIG. 5, the desired number of frames to be exposed can be set, and the picture-taking operation can automatically be inhibited when the preset number of frames have been exposed. Therefore, the film loaded in the camera is prevented from being wasted in the motor drive sequence mode, and any desired scene is prevented from being photographed with a smaller number of frames than a planned number of frames. Inasmuch as any remaining number of unexposed frames can be indicated at the time of interrupting the picture-taking operation, the motor-driven film winder is highly practical in use.

A still further embodiment will be described with reference to FIG. 8. In this embodiment, an interval or intermittent photographing system is composed of a camera and a motor-driven film winder. When the number of exposed frames reaches a preset number, the intermittent photographing operation of the interval photographing system is automatically canceled to stop subsequent picture-taking operation.

Figure 8:
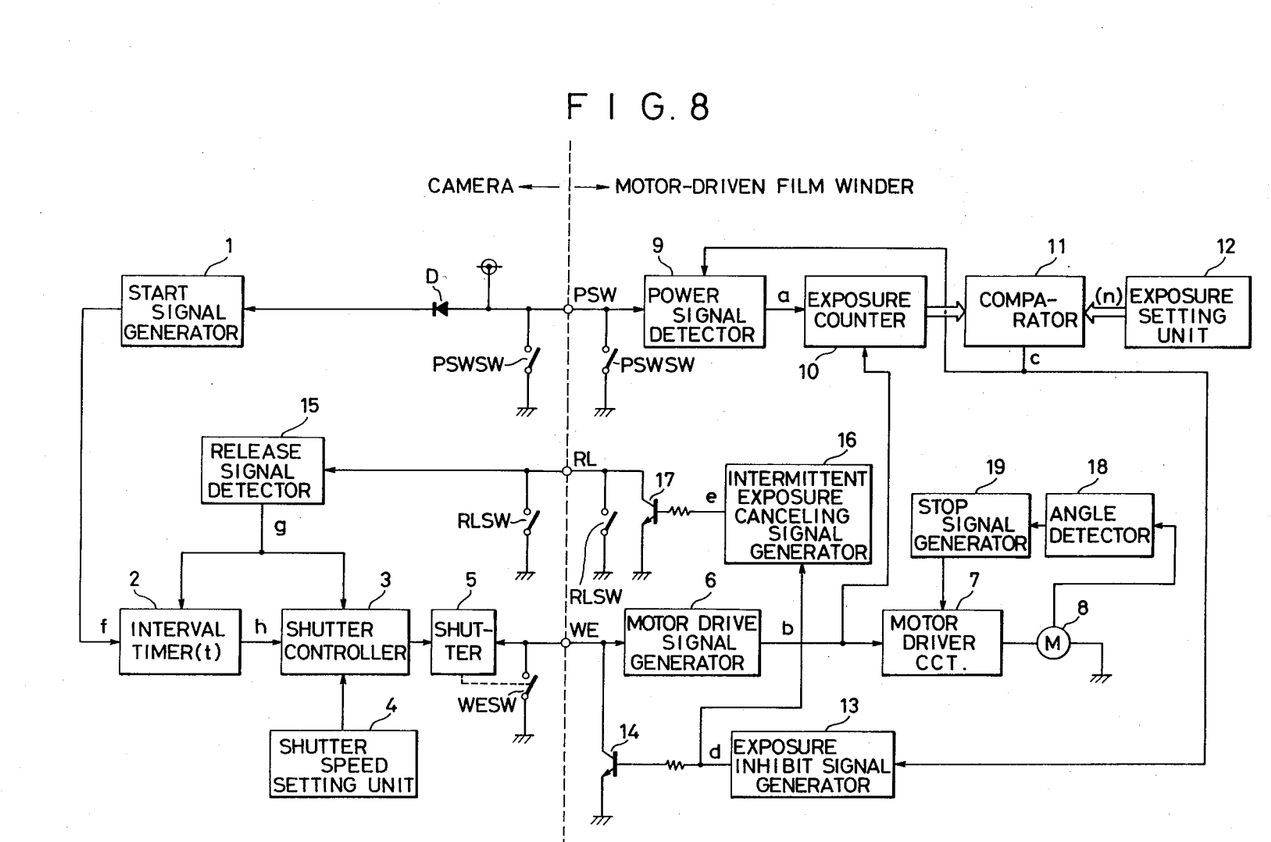
FIG. 8 is a block diagram of an interval or intermittent photographying system according to the present invention.
Figure 9:
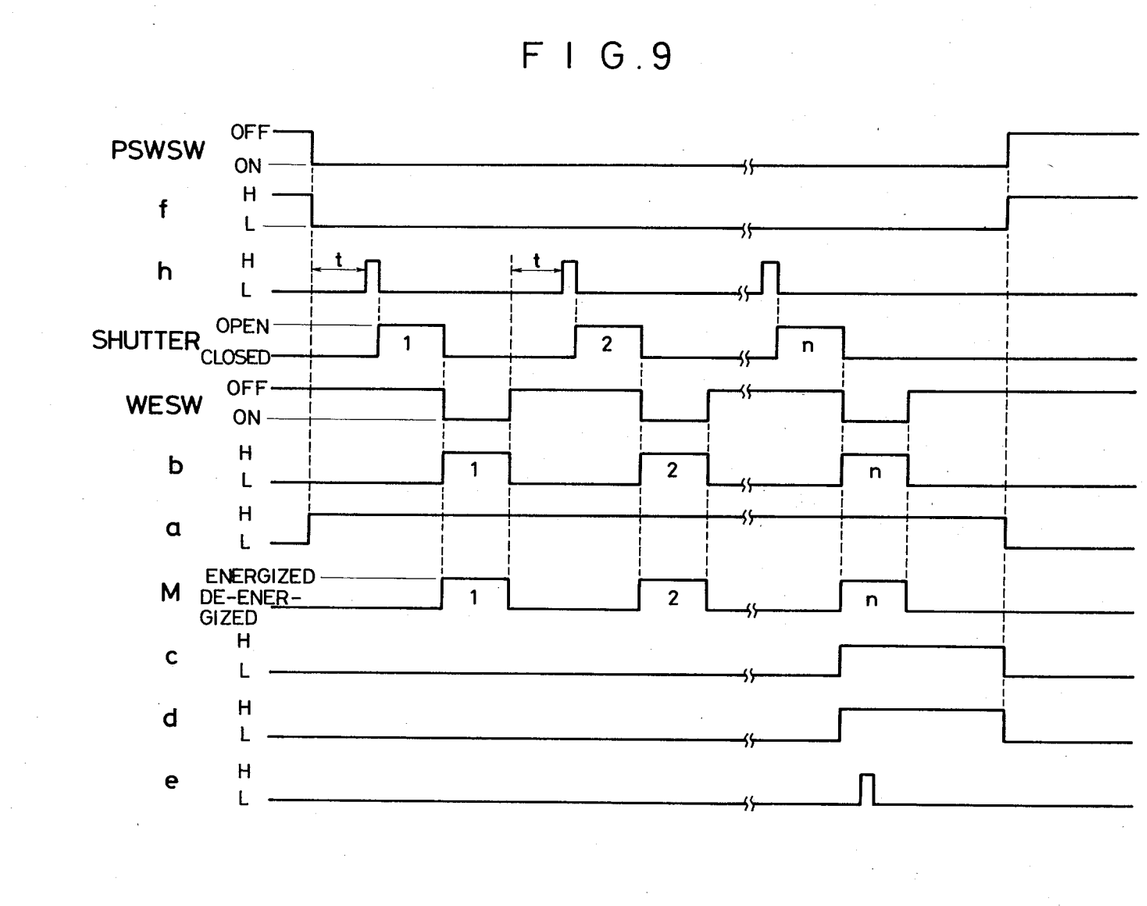
FIG. 9 is a timing chart explanating operation of the interval photographing system shown in FIG. 8.

As shown in FIG. 8, the power switch PSWSW is disposed in each of the camera and the motor-driven film winder. When an interval photographing-operation start button in the camera is depressed, the power switch PSWSW in the camera is turned on to issue a power signal PSW through a power signal line and a diode D to a start signal genrator 1. The start signal generator 1 issues a start signal f to an interval timer 2 in response to the power signal PSW. As illustrated in FIG. 9, the time interval t for which a picture is to be taken can be established in the interval timer 2 through external operation. The interval timer 2 is responsive to the start signal for intermittently issuing a picture-taking signal h at the established time interval t. The interval timer 2 is deenergized when an intermittent exposure canceling signal (described later). An exposure control means comprises a shutter controller 3, a shutter speed setting unit 4, and a shutter 5. In response to the picture-taking signal from the interval timer 2 or a release signal detector 15, the exposure control means is started, insofar as the film has been wound or the shutter has been charged, to compute appropriate exposure conditions based on information of light reflected from the object to be photographed (photometric information), information from the shutter speed setting unit 4, film sensitivity information, aperture information, etc., to control the aperture and shutter release time under the computed exposure conditions, and to open and close the shutter 5 for exposure. The camera has a winding sensing switch WESW which can be turned on when an exposure cycle is brought to an end. An exposure end signal of low level generated when the winding sensing switch WESW is turned on and a winding completion signal of high level generated when the winding sensing switch WESW is turned off are applied to the motor-driven film winder through a winding condition signal line and a winding condition signal terminal. These signals will also be referred to as a winding condition signal. The exposure end signal as applied to the motor-driven film winder is supplied to the motor drive signal generator 6 which generates a motor drive signal b supplied to the motor driver circuit 7. The motor driver circuit 7 energizes the film winding motor 8 each time the exposure end signal WE reaches the motor-driven film winder. When the winding completion signal is supplied, the motor driver circuit 7 de-energizes and brakes the motor 8, allowing the shutter to be released. The motor drive signal generator 6 and the motor driver circuit 7 thus serve as a motor control means response to the completion of exposure by the exposure control means 6 for energizing the motor 8 and also responsive to the completion of film winding operation for stopping the motor 8.

The power signal issued from the power switch PSWSW when the interval photographing-operation start button on the camera is applied to the motor-driven film winder through the power signal line and the power signal terminal. The power signal PSW is detected by the power signal detector 9 which produces a detected signal a. As shown in FIG. 9, the detected signal a is high while the power signal PSW is low or the power switch PSWSW is turned on, and is applied a reset signal to the exposure counter 10, which is reset by a negative-going edge of the detected signal a. The exposure counter 10 is also supplied with the motor-drive signal b as an input to be counted. Since the motor-drive signal b is produced each time the film winding motor is to be energized right after an exposure cycle is finished and until one film frame is transported, counting the motor-drive signal b with the exposure counter 10 is equivalent to counting how many times the film has been wound or how many exposures have been made. The count of the exposure counter 10, or the data indicative of the number of film frames exposed, is fed to the comparator 11 which compares the supplied data with data indicative of an exposure setting n representing the number of frames to be exposed and supplied from the exposure setting unit 12. If both of the data items compared coincide with each other, then the comparator 11 issues a coincidence signal c to enable the exposure inhibit signal generator 13 to produce an exposure inhibit signal d (FIG. 9). This exposure inhibit signal d turns on the switching element 14 (comprising a transistor in FIG. 1) connected between ground and the winding condition signal line WE for bringing the winding condition signal line to the ground potential. This is equivalent to application of the exposure inhibit signal d through the winding condition signal line to the camera, thus inhibiting subsequent shutter releasing operation.

The exposure inhibit signal d from the exposure inhibit signal generator 13 is applied to the intermittent exposure canceling siganl generator 16 to enable the same to issue an intermittent exposure canceling signal e (FIG. 9). The intermittent exposure canceling signal e energizes a switching element 17 comprising a transistor connected between ground and the signal line for the release signal RL, for thereby energizing the release signal detector 15 to generate a detected signal g. The detected signal g is applied as an intermittent exposure canceling signal to the interval timer 2 to stop operation thereof and as an exposure signal to the shutter controller 3. Since the exposure inhibit signal d is produced by the motor-driven film winder, as described above, the shutter controller 3 fails to open and close the shutter 5 even upon receipt of the detected signal g as the exposure signal.

When the preset number n of frames set by the exposure setting unit 12 have been exposed at the time interval set by the interval timer 2, subsequent picture-taking operation is inhibited and the film winding process is stopped even if the interval photographing operation start button is depressed or the power switch PSWSW is turned on. The detected signal a from the power signal detector 9 goes low when the power switch PSWSW is turned off and the power signal PSW goes high, insofar as the coincidence signal c is issued from the comparator 11. The exposure counter 10 is thus reset (see FIG. 9).

When the interval photographing operation start button is released to its initial position before the preset number of frames to be exposed is reached, the power signal detector 9 is supplied with the power signal PSW of high level. Since no coincidence signal c is issued from the comparator 11, however, the detected signal a from the power signal detector 9 remains high and the exposure counter 10 is not reset. The interval photographing operation is not affected inasmuch as the interval timer 2 keeps on operating. When a prescribed number of frames have subsequently been exposed, the comparator 11 issues a coincidence signal c to energize the switching element 14 through the exposure inhibit signal generator 13 for producing an exposure inhibit signal to inhibit subsequent exposure. As described above, the exposure inhibit signal d energizes the intermittent exposure canceling signal generator 16 to turn on the switching element 17 for generating the release signal RL of low level. The release signal detector 15 now applied the detected signal g to the interval timer 2 to cancel the intermittent photographing operation.

Upon return of the interval photographing operation start button on the camera (or a similar control button in the motor-driven film winder) to its initial position (the interval photographing operation start button is highly likely in many cases to return to its initial position soon after the interval timer 2 is started), the power switch PSWSW is turned off, and the detected signal a from the power signal detector 9 changes from the high level to the low level as long as the coincidence signal c is applied. Therefore, the exposure counter 10 is reset to the initial state.

The arrangement of FIG. 8 which is constructed and operates in the manner described above has the following advantages:

When a desired number of frames are exposed at a desired interval, the number of frames is automatically reset and the interval photographing operation is canceled. As a consequence, the film is prevented from wasteful consumption which would otherwise result from exposure of the maximum number of frames available larger than a the desired number of frames to be exposed. Since the camera operation automatically switches from the interval photographing mode to the normal photographing mode, any exposure failure arising from the user's manual mode switching failure can be eliminated. A desired number of frames can be exposed at prescribed intervals by the combination of the camera and the motor-driven film winder, without using any other accessories. Therefore, the overall interval photographing system is small in size for improved portability. Electric signals can be transmitted between the camera and the motor-driven film winder through three signal lines and three signal terminals. Specifically, the power signal line serves to transmit the power signal PSW to the start signal generator 1 and the power signal detector 9. The release signal line serves to transmit the shutter release signal RL and the intermittent photographing operation canceling signal to the release signal generator 15. The winding condition signal line serves to transmit the exposure end signal (winding start signal) to the motor drive signal generator 6 and also transmit the winding completion signal (which allows an exposure operation) and the exposure inhibit signal to the shutter control means (such as the shutter 5). As a result, the signal transmission system between the camera and the motor-driven film winder is highly simplified. The camera operation can immediately be switched from the interval photographing mode to the normal photographing mode simply by depressing the shutter release button and turning on the release switch RLSW. Therefore, the camera can be quickly readied for taking pictures in an emergency such as a crime committed in a bank, for example.

The interval photographing operation start button may be disposed on the motor-driven film winder rather than on the camera. The power signal PSW may be generated by half-depressing the release button, and the release signal RL may be generated by fully depressing the release button.

The exposure inhibit signal may be produced by the exposure inihibit signal generator 13 anytime while the winding condition sensing switch WESW is turned on after recept of the coincidence signal c, instead of being produced in sychronism with the coincidence signal c.

The interval timer 2, the start signal generator 1, and the like may be disposed in the motor-driven film winder.

The stop signal for stopping the motor 8 may be generated in the motor-driven film winder. More specifically, the motor-driven film winder may have an angle detector 18 for issuing a winding start signal and/or a winding completion signal when a member rotated by the motor 8 reaches an angle position in which the film starts being wound and/or the film winding is finished, and a stop signal generator 19 responsive to at least the winding completion signal from the angle detector 18 for applying a stop signal to the motor driver circuit 7 either in synchronism with the winding completion signal or with an appropriate time delay therefrom, thereby to de-energize the motor 8.

The motor-driven film winder may be contained in the camera, or may be separate from the camera and arranged for attachment to the camera.

Although certain preferred embodiments have been shown and described, it should be understood that many changes and modifications may be made therein without departing from the scope of the appended claims.

We claim:

1. A motor-driven film winder for use with a camera, comprising:

a film winding motor energizable in response to an exposure end signal generated from the camera each time an exposure cycle ends;

a counter for counting said exposure end signal, or a drive signal for driving said film winding motor, or a film winding completion signal;

exposure setting means for setting the number of frames to be exposed by the camera; and exposure inhibit signal generating means for issuing an exposure inhibit signal to said camera when the number of frames set by said exposure setting means coincides with the count of said counter.

2. A motor-driven film winder according to claim 1, wherein said counter can be reset by the off-state of a release signal issued from said camera.

3. A motor-driven film winder according to claim 1, wherein said counter can be reset by the off-state of a power signal issued from said camera insofar as the number of frames set by said exposure setting means coincides with the count of said counter.

4. A motor-driven film winder according to claim 1, wherein said counter can be reset by a manually-operated switch.

5. A motor-driven film winder according to claim 1, further including an unexposed frame indicating means for indicating the difference between the number of frames set by said exposure setting means and the count of said counter as the number of remaining unexposed frames when a shutter release operation of the camera is interrupted before the count of said counter reaches the number of frames set by said exposure setting means.

6. A motor-driven film winder according to claim 5, wherein said counter can be reset by the off-state of a power signal issued from said camera insofar as the number of frames set by said exposure setting means coincides with the count of said counter.

7. A motor-driven film winder according to claim 5, wherein said unexposed frame indicating means comprises means for emitting light or sound as many times as the number of remaining unexposed frames.

8. A camera and a motor-driven film winder for use with a camera, comprising:

a motor for winding a film to allow the camera to automatically take pictures at a prescribed interval;

exposure control means responsive to an exposure signal for determining appropriate exposure conditions to effect exposure operation;

intermittent exposure signal generating means for setting an exposure time interval response to external operation and for issuing an intermittent exposure signal at said set exposure time interval, said intermittent exposure signal generating means being de-energizable in response to an intermittent exposure canceling signal;

motor control means responsive to the completion of the exposure operation effected by said exposure control means for energizing said motor and also substantially responsive to the completion of film winding operation for de-energizing said motor;

a counter for counting an exposure end signal, a motor drive signal, or a film winding completion signal;

exposure setting means for setting the number of frames to be exposed by said camera;

exposure inhibit signal generating means for issuing an exposure inhibit signal to said camera when the number of frames set by said exposure setting means coincides with the count of said counter; and intermittent exposure canceling signal generating means for issuing an intermittent exposure canceling signal to said intermittent exposure signal generating means in response to said exposure inhibit signal.

* * * * *